Feb. 21, 1928.
D. K. GANNETT
1,659,729
CONSTANT VOLTAGE ALTERNATOR
Filed Nov. 24, 1923
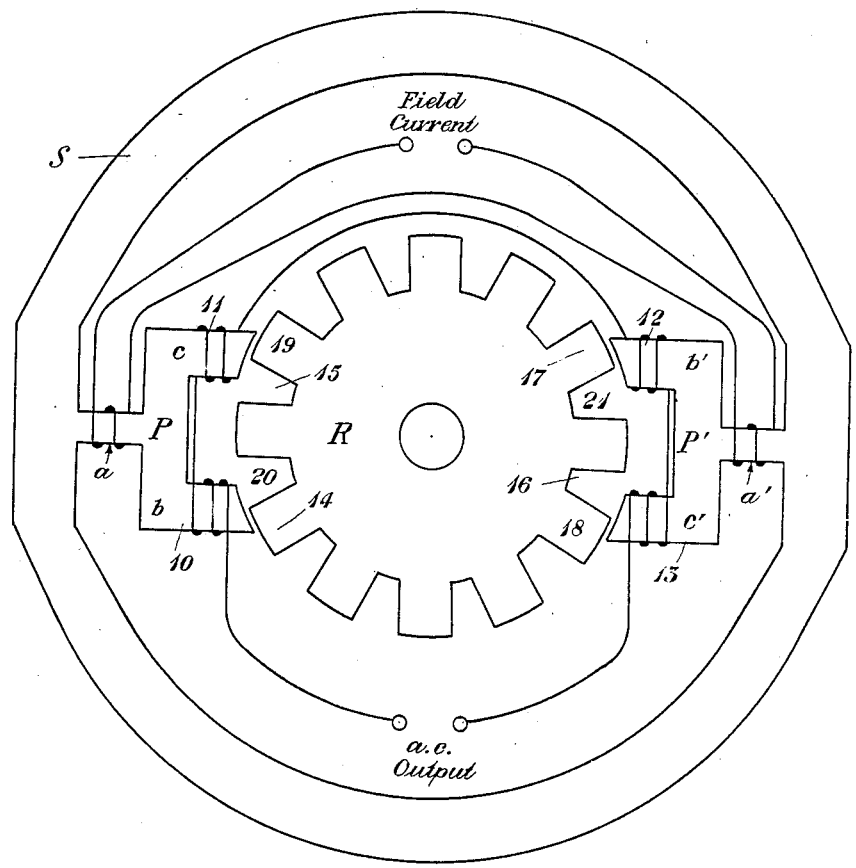
INVENTOR
D. K. Gannett
BY
ATTORNEY Patented Feb. 21, 1928.

1,659,729

UNITED STATES PATENT OFFICE.

DANFORTH K. GANNETT, OF JACKSON HEIGHTS, NEW YORK, ASSIGNOR TO AMERICAN TELEPHONE AND TELEGRAPH COMPANY, A CORPORATION OF NEW YORK.

CONSTANT-VOLTAGE ALTERNATOR.

Application filed November 24, 1923. Serial No. 676,837.

This invention relates to alternating current generators and particularly to generators in which the output voltage will be substantially constant regardless of variations in the exciting voltage.

In alternating current generators as usually constructed the amplitude of the output current varies with fluctuations in the applied direct current voltage which is used to excite the field. In many types of signaling systems and for measuring purposes and the like it is desirable to have a generator in which the output voltage will be substantially constant. For example, in a telephone system in which a voice frequency ringing current is used to control an automatic transmission regulator, it is desirable that the amplitude of the alternating current generated should be substantially constant. In multiplex carrier systems employing alternating carrier currents it is also desirable that the alternators generating the carrier currents to be used in connection with the several channels should generate alternating currents of substantially constant amplitude. Likewise, in many measurements of the type common in the telephone art, a constant amplitude alternating current is desirable. Accordingly, it is proposed by the present invention to provide an alternator in which the amplitude of the alternating output current will be substantially constant, notwithstanding fluctuations in the direct current voltage exciting the field. This result is accomplished by so designing the generator that portions of the magnetic circuit, including the field windings, will be saturated to such an extent that fluctuations in the field current do not cause appreciable variations in the magnetic flux. In order that the magnetic flux may then be varied to produce an alternating current the alternator is so constructed that a pluraltiy of magnetic paths are provided and the reluctance of the paths is so varied that while considerable changes are produced in the reluctance of the individual paths the reluctance of the paths in parallel will remain practically constant.

The invention may now be more fully understood from the following description when read in connection with the accompanying drawing, the figure of which illustrates a preferred embodiment of the invention. Referring to the drawing, the alternator of the present invention is shown as an inductor type of alternator comprising the usual rotor element R and stator element S. The rotor is in the form of the usual toothed disc, the teeth of the rotor being arranged to pass in front of pole pieces forming a part of the stator element. While any even number of pole pieces may be used in connection with the alternator of the present invention, as illustrated in the drawings only two pole structures are provided, as indicated at P and P'. Each pole structure is provided with a portion of restricted cross-section, as indicated at $a$ and $a'$, and with parallel portions as shown at $b$ and $c$ in the case of the pole structure P, and $b'$ and $c'$ in the case of pole structure P', these portions being arranged adjacent the periphery of the teeth of the rotor R.

The teeth of the rotor are so proportioned and spaced about the periphery of the rotor and so related to the parts of the pole pieces that when a tooth of the rotor lies just opposite one of the elements of the pole pieces as, for example, the element $c$, the corresponding element $b$ of the pole piece will have adjacent it the large air gap formed between two adjacent teeth of the rotor. Thus, the magnetic path including the element $c$, will form a path of minimum reluctance and the path, including the element $b$, will constitute a path of maximum reluctance. As the rotor revolves a point will be reached at which a tooth lies opposite the element $b$ and an open space opposite the element $c$. The conditions will now be reversed, the path including element $b$ constituting a path of minimum reluctance and the path including the element $c$ constituting a path of maximum reluctance.

Intermediate beween the two positions there is a condition in which the reluctance of one path is being increased while the reluctance of the other path is being proportionately decreased. Consequently, the parallel reluctance of the two magnetic paths, including the two pole elements $b$ and $c$ forming one field pole, is practically constant regardless of the position of the teeth of the armature. Notwithstanding this condition it is apparent that the reluctance of each individual path is cyclically varied as the rotor revolves. By properly relating windings, such as 10, 11, 12 and 13, to the several individual pole elements and including these windings in an output circuit, an alternating current may be taken off, notwithstanding the fact that the magnetic circuit including the two pole structures is saturated.

In restricting the portions a and a' of the pole structures in order to saturate the magnetic path, the restricted portions of the poles should be of such area as to present a reluctance somewhat greater than the reluctance of the portion of the magnetic circuit which includes one of the pole elements, such as c, for example, with the rotor so positioned that one of its teeth will lie just opposite the pole element. Under these circumstances, while the reluctance of the magnetic path, as a whole, cannot be increased, the reluctance of the individual paths, including the two pole elements, may be alternately increased without substantially changing the total reluctance.

To consider the operation in more detail let us assume that the rotor is in a position such that a tooth 14 lies in front of the pole element b, and a space 15 lies in front of the pole element c, while at the opposite pole piece a space 16 lies in front of the pole element c' and a tooth 17 lies in front of the pole element b'. A path of minimum reluctance may now be traced from the pole element b through the small air gap between said element and the tooth 14, through the tooth and across the rotor to the tooth 17, through the small air gap between said tooth and the pole element b' and thence through the latter pole element. A path of maximum reluctance can likewise be traced from the pole element c through space 15, over the rotor and thence through space 16 to pole element c'. The reluctance of these two paths in parallel may be somewhat less than the reluctance of the retricted portions a and a' of the magnetic path, yet the reluctance of one of the individual paths may be greater than and that of the other individual path less than the reluctance of the restricted portions.

Suppose, now, the rotor is shifted in a counter-clockwise direction to the position shown in the drawing. One-half of each of four teeth now lies in front of each of the pole elements so that the magnetic path extends from pole element b to the tooth 14 and then divides, branching to the teeth 17 and 18 and thence to the two pole elements b' and c'. Another path extends from the pole element c to the tooth 19 and then divides, passing through the rotor to the teeth 17 and 18 and thence to the pole elements b' and c'. The reluctance of each of the two paths, including the teeth 14 and 19, will now be approximately equal but the reluctance of the paths in parallel will be substantially the same as the reluctance of the paths in parallel under the condition previously considered.

If, now, the rotor be revolved another half tooth in a counter-clockwise direction, a path of minimum reluctance will be established from the pole element c over teeth 19 and 18 to pole element c' and likewise a path of maximum reluctance from pole element b through air space 20, across the rotor R and thence over air space 21 to the pole element b'. The total reluctance of these two paths will be substantially the same as before but the reluctances of the individual paths will be reversed with respect to the condition first considered.

Thus it will be seen that we have a condition in which the magnetic flux through the system cannot be greater than that determined by the saturating portions a and a', while the fluxes through the paths including consequent pole elements may be widely but oppositely varied. By properly poling the windings 10, 11, 12 and 13, a change in the flux through the pole element b in one direction will tend to produce a current in the winding 10 which assists the current produced in the winding 11 by a change in flux in the opposite direction through the pole element c. Likewise, the currents induced in windings 12 and 13 may be made not only to assist each other but to assist the currents induced in the windings 10 and 11.

To recapitulate briefly, the rotation of the rotor simply serves to shift the path of the flux from one branch of a pole to the other as the teeth of the rotor pass, and the variations of the fluxes of these individual paths tend to produce alternating currents in the output windings which assist each other and are of constant amplitude, regardless of variations of the current in the field windings shown located about the restricted portions a and a' of the core.

It will be obvious that the general principles herein disclosed may be embodied in many other organizations widely different from the spirit of the invention as defined in the following claims.

What is claimed is:

1. In an alternating current generator, a stator element and a rotor element including means to produce a magnetic fluid extending from one pole of the stator to another pole of the stator, said field comprising a plurality of parallel branch paths merging into a common path at the poles, means associated with said rotor element to vary the reluctance of at least one of said branch paths, and means to maintain a part of said common path saturated during operation at a flux value insufficient to saturate any one of said branch paths.

2. In an alternating current generator, a stator element and a rotor element including means to produce a magnetic field extending from one pole of the stator to another pole of the stator, said field comprising a plurality of parallel branch paths merging into a common path at the poles, means associated with said rotor element to vary the reluctance of at least one of said branch paths, a part of said common path being of restricted area, a magnetizing coil associated with said part of restricted area, means to produce a magnetizing force in said coil of such value as to maintain the restricted part of said common path saturated during operation at a flux value insufficient to saturate any one of said branch paths.

3. In an alternating current generator, a stator element and a rotor element including means to produce a magnetic field extending from one pole of the stator through the rotor to another pole of the stator, said field comprising a pair of branch paths through the rotor and merging into a common path at said poles, means associated with said rotor element to alternately vary the reluctance of said branch paths so that one increases as the other decreases while the total reluctance of the two branches remains substantially constant, and means to maintain a part of said common path saturated during operation at a flux value insufficient to saturate either branch path.

In testimony whereof, I have signed my name to this specification this 21st day of November, 1923.

DANFORTH K. GANNETT.